US009568975B2

(12) United States Patent
Sehgal et al.

(10) Patent No.: US 9,568,975 B2
(45) Date of Patent: Feb. 14, 2017

(54) POWER BALANCING TO INCREASE WORKLOAD DENSITY AND IMPROVE ENERGY EFFICIENCY

(71) Applicants: Naresh K. Sehgal, Santa Clara, CA (US); Mrittika Mrittika Ganguli, Bangalore (IN); Slawomir Putyrski, Gdynia (PL); Marek Jakowski, Gdynia (PL); Arkadiusz Chylinski, Gdansk (PL)

(72) Inventors: Naresh K. Sehgal, Santa Clara, CA (US); Mrittika Mrittika Ganguli, Bangalore (IN); Slawomir Putyrski, Gdynia (PL); Marek Jakowski, Gdynia (PL); Arkadiusz Chylinski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,666

(22) PCT Filed: Aug. 13, 2013

(86) PCT No.: PCT/PL2013/000103
§ 371 (c)(1),
(2) Date: Dec. 27, 2013

(87) PCT Pub. No.: WO2015/023191
PCT Pub. Date: Feb. 19, 2015

(65) Prior Publication Data
US 2016/0170469 A1 Jun. 16, 2016

(51) Int. Cl.
*G06F 1/32* (2006.01)
*G06F 9/50* (2006.01)

(52) U.S. Cl.
CPC ............. *G06F 1/3206* (2013.01); *G06F 9/505* (2013.01); *G06F 9/5094* (2013.01); *Y02B 60/142* (2013.01)

(58) Field of Classification Search
CPC ............................... G06F 9/505; G06F 9/5094
See application file for complete search history.

(56) References Cited

U.S. PATENT DOCUMENTS

2010/0030877 A1* 2/2010 Yanagisawa .......... G06F 9/5088
709/221
2010/0115509 A1 5/2010 Kern et al.
(Continued)

FOREIGN PATENT DOCUMENTS

KR 20110036172 A 4/2011

OTHER PUBLICATIONS

"The Problem of Power Consumption in Servers," Intel, Apr. 1, 2009, 13 pages.
(Continued)

*Primary Examiner* — Albert Wang
(74) *Attorney, Agent, or Firm* — Barnes & Thornburg LLP

(57) ABSTRACT

Technologies for adjusting server power consumption include a computing device to receive resource utilization data from a plurality of servers. The computing device identifies a source server and a destination server of the plurality of servers based on the resource utilization data and calculates the difference in resource utilization between the identified source server and the identified destination server based on the resource utilization data. If the computing device determines that the difference exceeds a threshold value, the computing device increases processor utilization of a processor of the source server by a power consumption change amount and decreases processor utilization of a
(Continued)

processor of the destination server by a corresponding power consumption change amount to balance the servers' resources and create more head-room to place new workloads on the servers.

24 Claims, 5 Drawing Sheets

(56) References Cited

U.S. PATENT DOCUMENTS

| | | |
|---|---|---|
| 2011/0077795 A1 | 3/2011 | VanGilder et al. |
| 2011/0083134 A1 | 4/2011 | Song et al. |
| 2011/0225300 A1* | 9/2011 | Kaneki .................. G06F 9/5088 709/226 |

OTHER PUBLICATIONS

Meisner, Davie, et al., "PowerNap: Eliminating Server Idle Power," Mar. 2009, 12 pages.

Dupont, Corentin, et al., "An Energy Aware Framework for Virtual Machine Placement in Cloud Federated Data Centres," May 2012, 10 pages.

Tsirogiannis, Dimitris, et al., "Analyzing the Energy Efficiency of a Database Server," Jun. 2010, 12 pages.

Goudarzi, Hadi, et al., "Energy-Efficient Virtual Machine Replication and Placement in a Cloud Computing System," 8 pages.

Barroso, Luiz Andre, et al., "The Datacenter as a Computer; An Introduction to the Design of Warehouse-Scale Machines," 2009, 108 pages.

Fang, Weiei, et al., "VMPlanner: Optimizing virtual machine placement and traffic flow routing to reduce network power costs in cloud data centers," Sep. 12, 2012, 18 pages.

"Transforming Mission-Critical Computing: Intel Xeon Processor E5-4600/2600/2400/1600 Product Families," Intel Corporation 2012, 4 pages.

"The Intelligent Choice for Evolving Data Centers: Intel Xeon Processor E7-8800/4800/2800 Product Families," Intel Corporation 2011, 4 pages.

"Samsung Green DDR3," 8 pages.

"Intelligent Platform Management Interface," http://en.wikipedia.org/wiki/Intelligent_Platform_Management_Interface, accessed Jul. 18, 2014, 6 pages.

"Advanced Message Queuing Protocol," http://en.wikipedia.org/wiki/Advanced_Message_Queuing_Protocol, accessed Jul. 18, 2014, 10 pages.

International Search Report and Written Opinion received for International Application No. PCT/PL2013/000103, mailed May 28, 2014, 10 pages.

Srikantaiah et al., "Energy Aware Consolidation for Cloud Computing," Online Proceedings of Hot Power '08, Workshop on Power Aware Computing and Systems, available from: <https://www.usenix.org/legacy/events/hotpower08/tech/full_papers/srikantaiah/srikantaiah.pdf>, Dec. 7, 2008, 56 pages.

Elnozahy et al., "Energy-Efficient Server Clusters," Proceedings of the 2nd International Conference on Power-Aware Computer Systems (PACS'02), Feb. 2, 2002, 18 pages.

Notice of Preliminary Rejection and English Summary for Korean Patent Application No. 10-2016-7000893, dated Nov. 10, 2016, 10 pages.

* cited by examiner

POWER BALANCING TO INCREASE WORKLOAD DENSITY AND IMPROVE ENERGY EFFICIENCY

CROSS REFERENCE TO RELATED APPLICATIONS

This application is a national stage entry under 35 USC §371(b) of International Application No. PCT/PL2013/000103, which was filed Aug. 13, 2013.

BACKGROUND

Cloud computing has expanded the use of data centers for today's computing needs. Data centers provide computational services and resources such as data processing and storage and oftentimes include a large number of servers arranged in groups that are controlled by a group controller. The workloads handled by a data center utilize server hardware resources to various extents. For example, some workloads may predominantly utilize memory and data storage, whereas other workloads may predominantly utilize the servers' processors, which results in inefficient use of computational resources. In an effort to remedy those inefficiencies, IT managers oftentimes balance the workloads by moving them (e.g., among servers), which is inefficient as the workloads may change over time.

Data centers are growing in size, complexity, and the amount of power consumption. As the cost of energy continues to rise throughout the world, businesses have searched for opportunities to improve the energy efficiency of systems in their employ, including data centers and other computing devices in their networks. Generally, efforts have been taken on at least two fronts to improve the energy efficiency of those systems—to reduce the power consumption of servers in data centers and to increase the efficiency with which the consumed power is used.

BRIEF DESCRIPTION OF THE DRAWINGS

The concepts described herein are illustrated by way of examples only, and not by way of limitation, in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
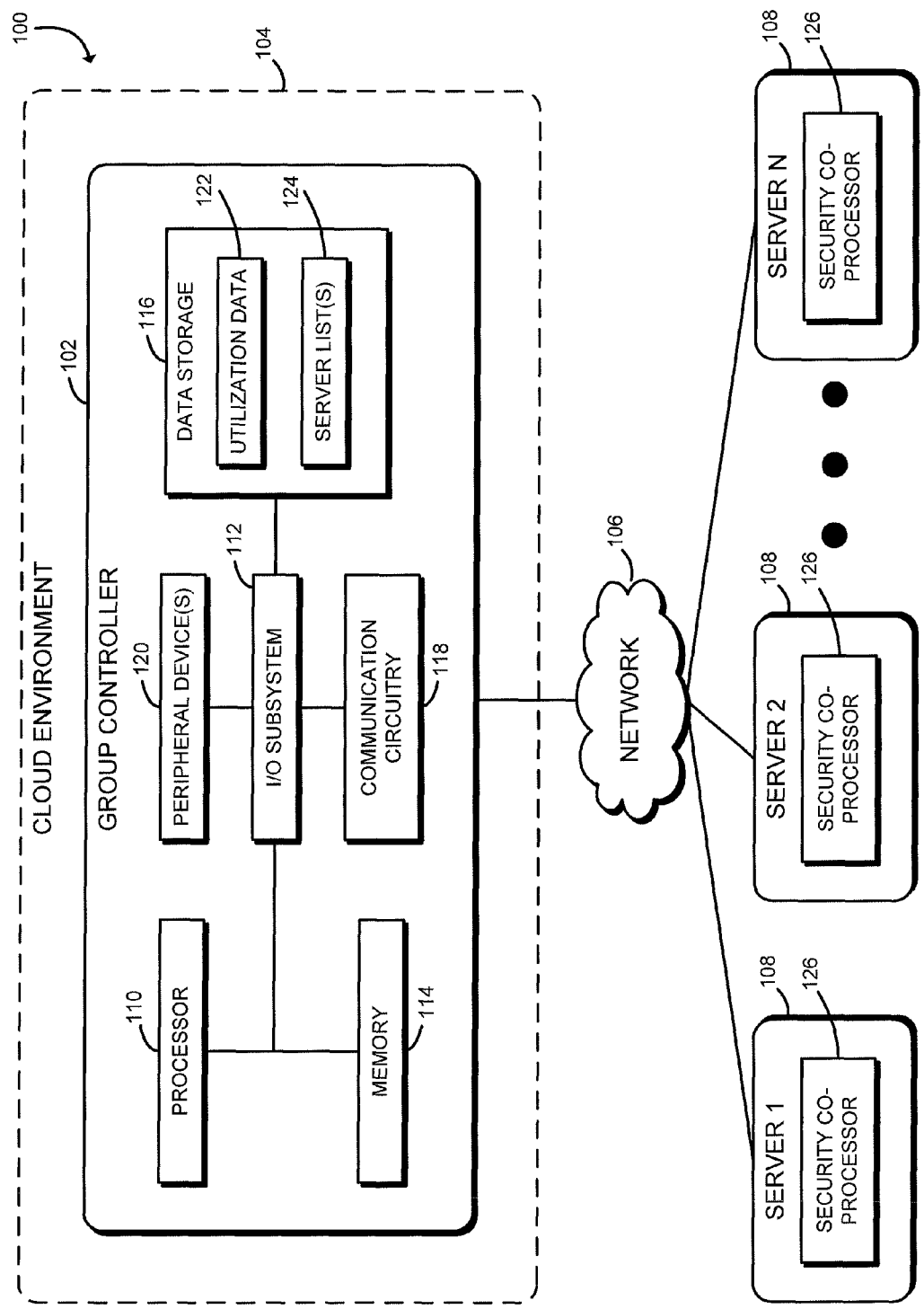
FIG. 1 is a simplified block diagram of at least one embodiment of a system for adjusting server power consumption.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for adjusting server power consumption includes a group controller 102, a network 106, and a plurality of servers 108. In use, as discussed in more detail below, the group controller 102 may receive resource utilization data from the servers 108 belonging to its group and balance the power among those servers 108. Specifically, the group controller 102 may increase processor utilization of one of the servers 108 and decrease processor utilization of another one of the servers 108 in order to better balance workloads and improve energy efficiency. The group controller 102 may be embodied as any type of computing device capable of establishing a communication link with servers 108 and performing the functions described herein. For example, the group controller 102 may be embodied as a server, web portal device, desktop computer, cellular phone, smartphone, tablet computer, laptop computer, personal digital assistant, mobile Internet device, and/or any other computing/communication device.

As shown in FIG. 1, the illustrative group controller 102 includes a processor 110, an input/output ("I/O") subsystem 112, a memory 114, a data storage 116, a communication circuitry 118, and one or more peripheral devices 120. Of course, the group controller 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the group controller 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the group controller 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the group controller 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. As shown in FIG. 1, the data storage 116 includes resource utilization data 122 and one or more server lists 124. The resource utilization data 122 may be received from each of the servers 108 and provide information regarding an amount, type, and/or extent of utilization of a particular resource of the server 108 (e.g., memory utilization, processor utilization, network utilization, or other resource utilization information), which may be used to balance power consumption among the servers 108. Of course, in other embodiments, the resource utilization data 122 may received from computing devices other than the servers 108 (e.g., resource monitoring devices).

Further, the group controller 102 may receive one or more lists 216 of the servers 108 for which to adjust power consumption. For example, the group controller 102 may retrieve the server lists 216 including all of the servers 108 belonging to the group associated with the group controller 102. In some embodiments, the server lists 216 may be generated (e.g., by the group controller 102) based on the servers 108 assigned to the group controller 102. It should be appreciated that the particular servers 108 assigned to, controlled by, or otherwise associated with the group controller 102 may vary over time. Additionally, as discussed below, the group controller 102 may sort the server list 216 based on the resource utilization data 122. In some embodiments, one or more of such sorted lists may also be stored in the data storage 116.

The communication circuitry 118 of the group controller 102 may be embodied as any communication circuit, device, or collection thereof, capable of enabling communications between the group controller 102 and other remote devices (e.g., the servers 108) over the network 106. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication. The communication circuitry 118 may further be configured to use a variety of messaging protocols. For example, the communication circuitry 118 may communicate with the servers 108 using the Advanced Message Queuing Protocol (AMQP). In some embodiments, the communication circuitry 118 may establish an in-band and/or out-of-band communication connection with one or more of the servers 108. For example, the communication circuitry 118 may use an Intelligent Platform Management Interface (IPMI) to enable out-of-band communication between the group controller 102 and one or more components of the server 108 (e.g., a security co-processor).

The one or more peripheral devices 120 of the group controller 102 may include any number of additional peripheral or interface devices. The particular devices included in the peripheral devices 120 may depend on, for example, the type and/or intended use of the group controller 102. As shown in FIG. 1, the group controller 102 may belong to or otherwise form a portion of a cloud environment 104. The cloud environment 104 may be embodied as any cloud computing environment suitable for distributed computing and/or resource management and capable of performing the functions described herein. It should be appreciated that, in some embodiments, the servers 108 may, alternatively or additionally, form a portion of the cloud environment 104.

The network 106 may be embodied as any type of communication network capable of facilitating communication between the group controller 102 and the servers 108. As such, the network 106 may include one or more networks, routers, switches, computers, and/or other intervening devices. For example, the network 106 may be embodied as or otherwise include one or more local or wide area networks, publicly available global networks (e.g., the Internet), cellular networks, telephone networks, ad hoc networks, or any combination thereof. Of course, it should be appreciated that the group controller 102 may communicate with the servers 108 over one network 106, whereas the group controller 102 and/or the servers 108 may communicate with other remote devices over another network 106.

Each of the servers 108 may be embodied as any type of computing device or server capable of performing the functions described herein. For example, in some embodiments, each of the servers 108 may be similar to the group controller 102 as described above. That is, each server 108 may be embodied as an enterprise-level server computer, a desktop computer, a laptop computer, a tablet computer, a cellular phone, smartphone, personal digital assistant, mobile Internet device, and/or any other computing/communication device. Further, the servers 108 may include components similar to those of the group controller 102 discussed above. The description of those components of the group controller 102 is equally applicable to the description of components of the servers 108 and is not repeated herein for clarity of the description.

As illustratively shown in FIG. 1, each of the servers 108 may also include a security co-processor 126. The security co-processor 126 may be embodied as any hardware component(s) or circuitry capable of performing the functions described herein. In some embodiments, the security co-processor 126 is capable of establishing a trusted execution environment. For example, the security co-processor 126 may be embodied as a trusted platform module (TPM), a manageability engine (ME), a converged security engine (CSE), or another out-of-band processor. In some embodiments, the security co-processor 126 is embodied as an out-of-band processor configured to operate independently and in an out-of-band manner relative to the main processor of the server 108. The security co-processor 126 may enable the server 108 to communicate with the group controller 102 via an out-of-band communication channel in some embodiments. Further, it should be appreciated that the servers 108 may include other components, sub-components, and devices commonly found in a computing device or server, which are not discussed above in reference to the group controller 102 and not discussed herein for clarity of the description. As indicated above, the servers 108 may belong to a group associated with the group controller 102. It should be appreciate that the particular servers belonging to the group of the group controller 102 may be defined or otherwise established in any suitable way. For example, in one embodiment, each rack of servers 108 may constitute a group controlled by the group controller 102. Additionally, in some embodiments, the group controller 102 may be configured to control multiple groups of servers.

Figure 2:
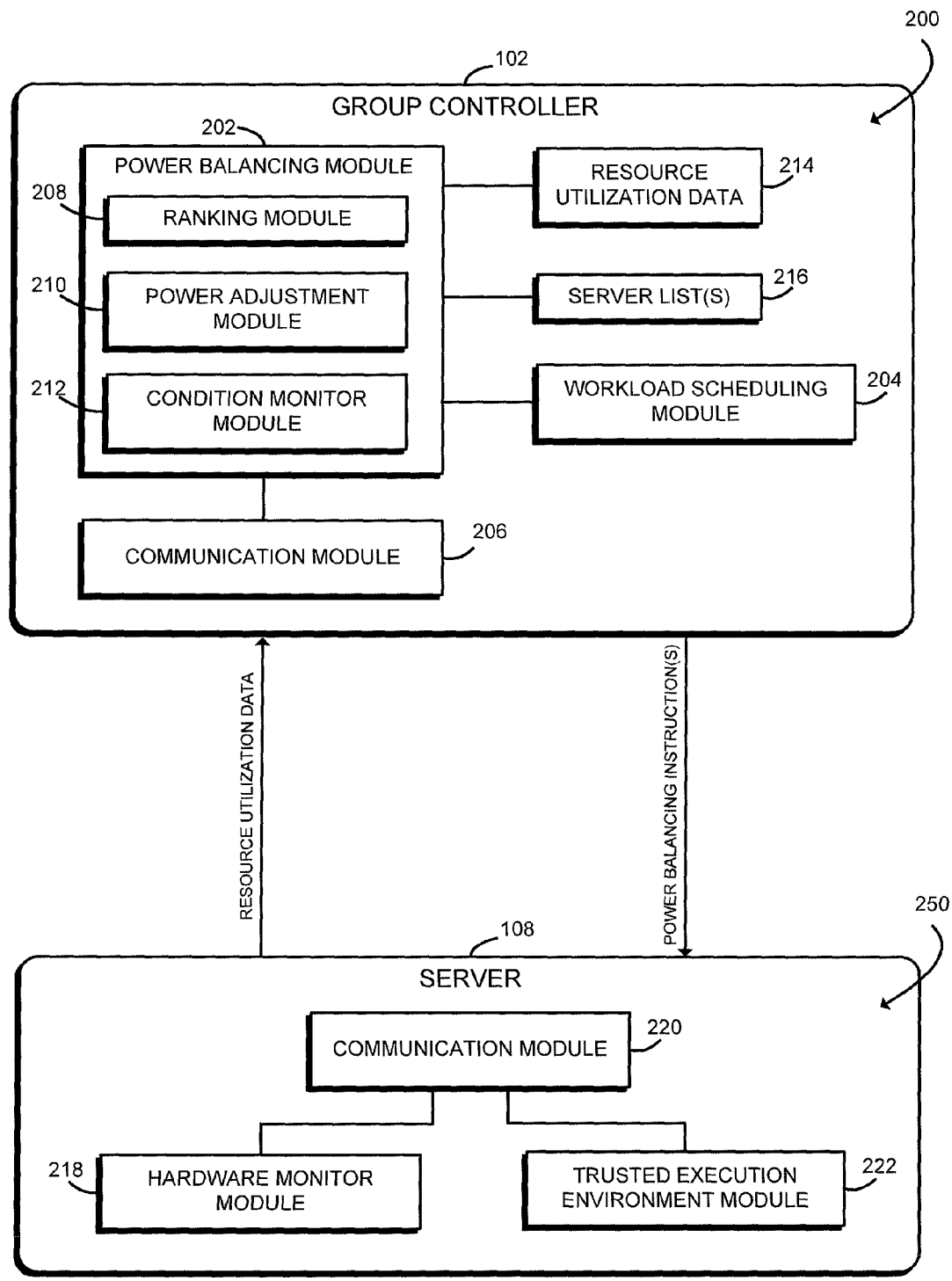
FIG. 2 is a simplified block diagram of at least one embodiment of an environment of a computing device and an environment of a server of the system of FIG. 1.

Referring now to FIG. 2, in use, the group controller 102 of the system 100 establishes an environment 200 and the server 108 of the system 100 establishes an environment 250 for adjusting server power consumption. The environment 200 of the group controller 102 in the illustrative embodiment includes a power balancing module 202, a workload scheduling module 204, a communication module 206, resource utilization data 214, and one or more server lists 216. Additionally, the power balancing module 202 includes a ranking module 208, a power adjustment module 210, and a condition monitor module 212. Furthermore, the environment 250 of the server 108 in the illustrative embodiment includes a hardware monitor module 218, a communication module 220, and a trusted execution environment module 222. Each of the power balancing module 202, the workload scheduling module 204, the communication module 206, the ranking module 208, the power adjustment module 210, the condition monitor module 212, the security co-processor 126, the hardware monitor module 218, the communication module 220, and the trusted execution environment module 222 may be embodied as hardware, software, firmware, or a combination thereof.

As discussed in more detail below, the power balancing module 202 balances the power consumption of the servers 108 based on the resource utilization data 214 of the servers 108. The power consumption of each of the servers 108 may be dictated by factors including, for example, a voltage and frequency operating point of the processor(s) in the server 108 and other power-related factors. For example, in one embodiment, a first and second server 108 may each include a processor operating at a certain frequency (e.g., 2.0 Gigahertz). As such, the processors of each of the servers 108 consume approximately the same amount of power. The first server 108 may be handling workloads involving almost exclusively memory accesses, whereas the second server 108 may be handling workloads that are processor-intensive. In such an embodiment, the first server 108 is utilizing its processor significantly less than the second server 108 is utilization its processor. Accordingly, the power balancing module 202 may "shift" the power unnecessarily consumed by the processor of the first server 108 to the second server 108. That is, in some embodiments, the power balancing module 202 reduces power allocation on the servers 108 in which processors are not extensively used and increase it by a corresponding amount on the servers 108 in which processor utilization is significant without impacting the total power consumption between the server 108. As discussed below, in doing so, the power balancing module 202 may, for example, modify the voltage and frequency operating point of the processors of the servers 108. In some embodiments, the power balancing module 202 may also incorporate power capping features to cap the power consumption of the servers 108 and/or components of the servers 108.

The ranking module 208 receives the resource utilization data 214 regarding the servers 108 and ranks (i.e., sorts) them according to an amount of resource utilization of the servers 108. For example, in one embodiment, the resource utilization data 214 may include memory utilization data, and the ranking module 208 may generate a sorted list of the servers 108 ranked by an amount of memory utilization of the servers 108. In another embodiment, the resource utilization data 214 may indicate an amount of processor utilization of the servers 108, which may be used to rank the servers 108 accordingly. It should be appreciated that any one or more suitable aspects of the resource utilization data 214, alone or in combination, may be used to rank the servers 108 in various embodiments.

The ranking module 208 may also identify each of the servers 108 in the sorted list as a source server or destination server. As discussed herein, power is "shifted" from the source server to the destination server by the power balancing module 202. In the example above, the first server 108 is the source server, and the second server 108 is the destination server. In some embodiments, the ranking module 208 identifies half of the servers 108 in the sorted list as source servers and half of the servers 108 in the sorted list as destination servers based on the order of the servers 108 in the sorted list. For example, in some embodiments, the first half of the servers 108 in the sorted list, which is ranked by resource utilization of the servers 108, is source servers and the second half of the servers 108 is destination servers.

The ranking module 208 may also provide the resource utilization data and/or ranking information (e.g., the sorted lists) to the workload scheduling module 204 so that the workload scheduling module 204 may, for example, determine at which server 108 to place or route new workloads and/or virtual machines. In doing so, the workload scheduling module 204 may utilize any ranking, scheduling, and/or other algorithms suitable for scheduling workloads and/or placing virtual machines. It should be appreciated that workloads make use of differing computational resources. Accordingly, the workload scheduling module 204 may utilize that information to appropriately schedule new workloads to minimize power consumption of the servers 108 and/or maximize the workload density of workloads executing on the servers 108 without increasing total power consumption of the data center.

The power adjustment module 210 adjusts the amount of power consumed by one or more components of the servers 108. In illustrative embodiment, the power adjustment module 210 adjusts the power consumed by the processors of the servers 108. However, in other embodiments, the power consumption of other components may be modified using the methods and architecture described herein. As indicated below, the power adjustment module 210 may adjust the power consumption of the servers 108 in pairs (e.g., reducing power consumption by a certain amount in one server 108 while increasing power consumption by the same amount in another server 108). For example, the server 108 in the sorted list having the greatest resource utilization may be paired with the server 108 in the sorted list having the least resource utilization. Further, the server 108 in the sorted list having the second greatest resource utilization may be paired with the server 108 in the sorted list having the second least resource utilization and so on. In some embodiments, the power adjustment module 210 calculates the difference in resource utilization between the pair of servers 108 (e.g., a source-destination server pair) and adjusts the power consumption of the servers 108 only if a threshold value for the difference is surpassed. That is, in some embodiments, the power adjustment module 210 may not adjust power consumption between two servers 108 if the difference in their resource utilizations is minimal. It should be appreciated that the power consumed by the servers 108 may be adjusted according to any other suitable algorithm or grouping of servers 108 in other embodiments.

In the illustrative embodiment, the power adjustment module 210 may adjust the power consumed by a processor of one of the servers 108 by, for example, modifying its processor state (i.e., its "P-state"). In other words, the power adjustment module 210 may adjust the processor's voltage and frequency operating point (oftentimes, referred to simply as the frequency operating point). It should be appreciated that the amount of power consumed by the processor is reduced when the frequency operating point of the processor is reduced. Similarly, the amount of power consumed by the processor is increased when the frequency operating point of the processor is increased. In other words, the power consumption of the processor is directly proportional to the frequency operating point of the processor. Additionally, reducing the frequency operating point of the processor causes the effective processor utilization of the processor to increase for a given workload, because the same work is now to be processed with the processor operating at a lower frequency. Likewise, increasing the frequency operating point of the processor causes the effective processor utilization to decrease. By modifying the frequency operating point of the processor, for example, the processor's utilization is brought in line with the power consumption rates of that server's resources by its allocated workload. Of course, in other embodiments, the power adjustment module 210 may adjust the power consumed by the component(s) of the servers 108 using any suitable mechanisms.

The condition monitor module 212 determines when the power balancing module 202 should reassess the power consumption situation of the servers 108 based on the resource utilization data 214. For example, the condition monitor module 212 may implement a timer such that the power consumption of the servers 108 is assessed periodically or based on some other temporal limitation or condition. In other embodiments, the condition monitor module 212 may monitor for the occurrence of some other condition (e.g., a threshold number of new or unplaced workloads) in order for the power balancing module 202 to assess power consumption. In some embodiments, the condition monitor module 212 may also establish conditions (e.g., periodically) in which the group controller 102 is to receive or request resource utilization data 214 from the servers 108. Of course, in other embodiments, such a determination may instead be made by the servers 108.

The communication module 206 handles the communication between the group controller 102 and remote devices (e.g., the servers 108) through the network 106. As discussed herein, the communication module 206 may receive resource utilization data 214 from the servers 108. In doing so, the communication module 206 may use a messaging protocol such as AMQP. Additionally, the communication module 206 may transmit power balancing instructions to the servers 108 (e.g., via secure transmission using IPMI or another out-of-band communication mechanism). As indicated above, the power balancing instructions include information identifying which components of the servers 108 are to be modified (e.g., processor, network interface controller, etc.) and how they should be modified (e.g., reduce frequency operating point, increase frequency operating point, change P-state of processor to "0," etc.).

As indicated above, each of the servers 108 includes a hardware monitor module 218, a communication module 220 and a trusted execution environment module 222. The hardware monitor module 218 of the server 108 monitors the utilization of one or more resources of the server 108 (e.g., processor, memory, network interface card, co-processor, or other components). Additionally, the hardware monitor module 218 generates the resource utilization data 214 for that particular server 108 based on the monitored resource utilization. It should be appreciated that the resource utilization data 214 may represent the resource utilization in any suitable way. For example, the resource utilization data may be represented as absolute values, relative values, percentages, ratios, distributions, or any other suitable representation.

The communication module 220 handles the communication between the server 108 and remote devices (e.g., the group controller 102) through the network 106. As discussed above, the communication module 220 may transmit the generated resource utilization data 214 to the group controller 102. Depending on the particular embodiment, the communication module 220 may transmit the resource utilization data 214 periodically or in response to the occurrence of some condition (e.g., completion of a particular number of workloads). The communication module 220 may also receive the power balancing instructions from the group controller 102 instructing the server 108 to modify a component of the server 108 to balance power consumption between the server 108 and another server.

The trusted execution environment module 222 may receive the power balancing instructions (e.g., from the communication module 220 or from the group controller 102 directly) and modify the identified component of the server 108 accordingly to effect power consumption. The trusted execution environment module 222 may establish a secure and trusted execution environment for the server 108. In some embodiments, the security co-processor 126 includes the trusted execution environment module 222. That is, the trusted execution environment module 222 may be incorporated into or executed by the security co-processor 126. Further, in some embodiments, the power balancing instructions from the group controller 102 may only be received or handled by the trusted execution environment module 222. Accordingly, the trusted execution environment module 222 (or the security co-processor 126) may, for example, modify the processor utilization of the processor of the server 108 (e.g., by modifying the frequency operating point of the processor) based on the power balancing instruction received from the group controller 102.

Figure 3:
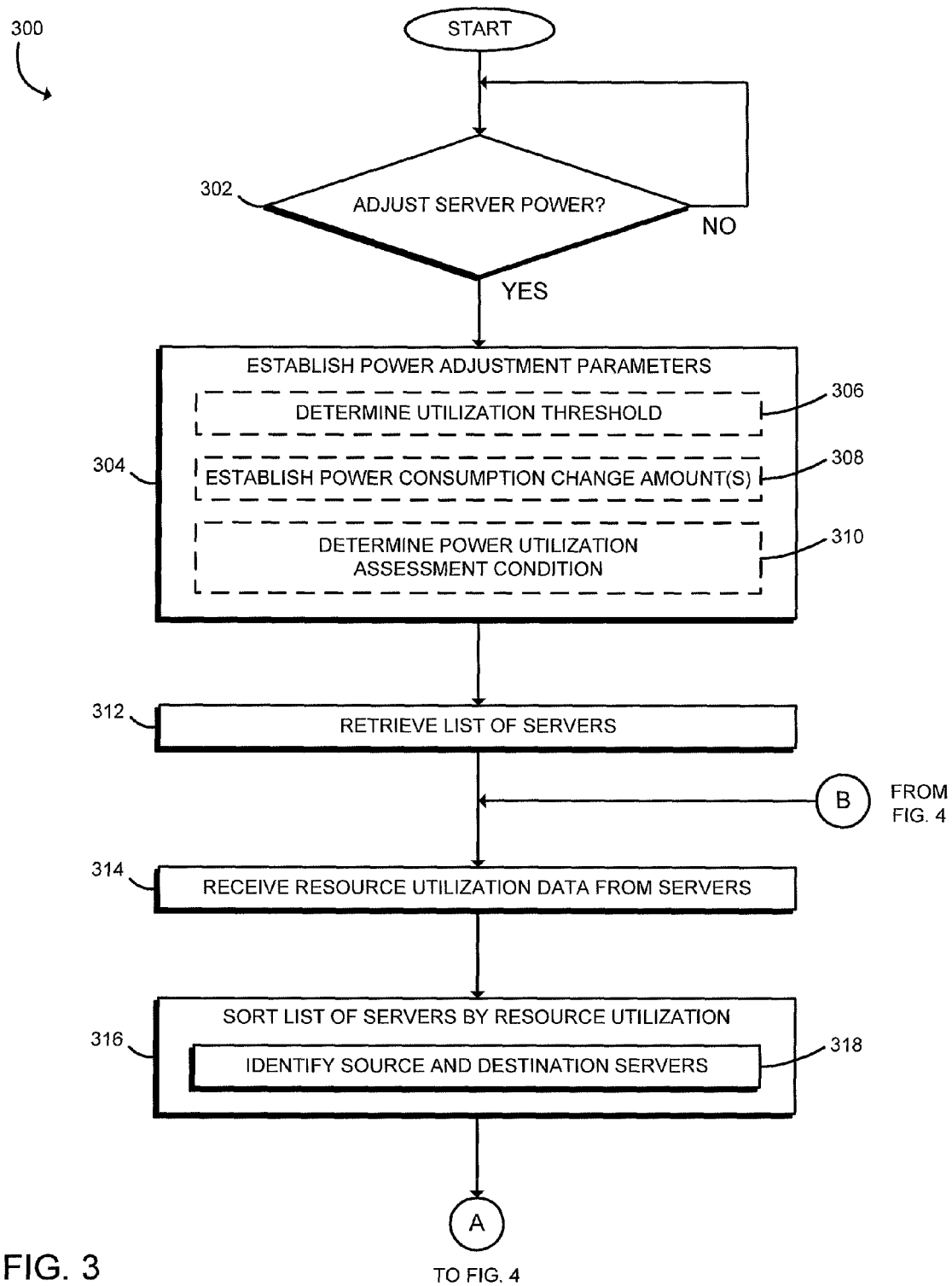
FIGS. 3 and 4 are a simplified flow diagram of at least one embodiment of a method for adjusting server power consumption on the group controller of the system of FIG. 1.
Figure 4:
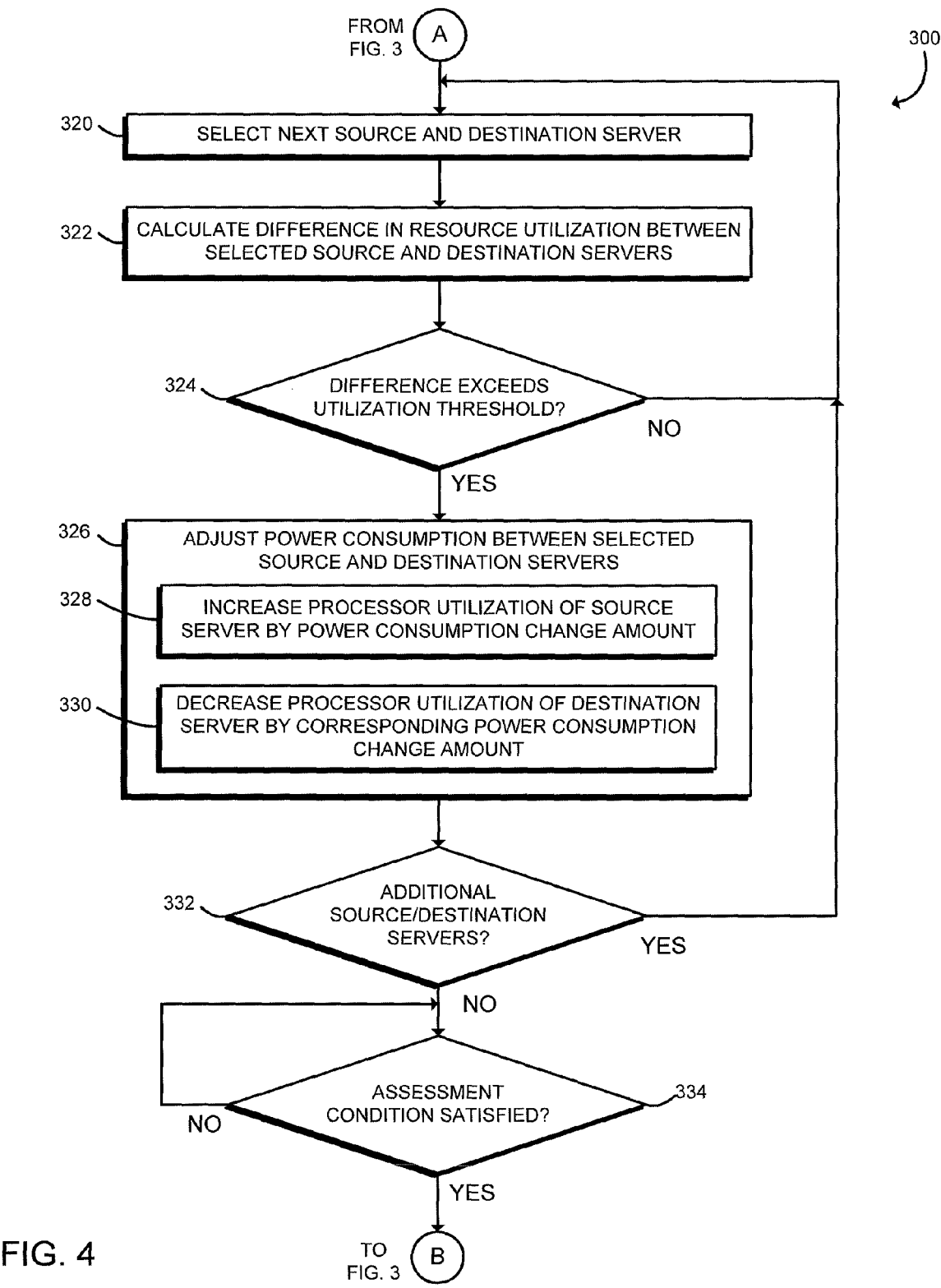

Referring now to FIGS. 3 and 4, in use, the group controller 102 of the system 100 may execute a method 300 for adjusting server power consumption. The illustrative method 300 begins with block 302 of FIG. 3 in which the group controller 102 determines whether to adjust the power consumption of the servers 108. If so, the group controller 102 establishes power adjustment parameters in block 304. For example, the group controller 102 may determine a utilization threshold in block 306, which may used to determine whether to balance power consumption between two servers 108 as discussed below. That is, the group controller 102 may calculate the difference (i.e., a "utilization difference") in resource utilization between a source server and a destination server (i.e., for power transfer) and, in some embodiments, the group controller 102 only balances power between the selected source and destination servers if the utilization difference is greater than the utilization threshold. In block 308, the group controller 102 may establish power consumption change amounts. That is, the group controller 102 may determine amounts (e.g., an absolute value, percentage, or other amount) by which to increase/decrease the power consumption of the corresponding servers 108. In the illustrative embodiment, the power consumption of the source and destination servers are modified by the same power consumption change amount. Additionally, in block 310, the group controller 102 may determine a power utilization assessment condition. In other words, the group controller 102 may determine when to reassess the power consumption status of the servers 108 based on the resource utilization data 214. As discussed above, the power utilization assessment condition may be based on the expiration of a period of time or the occurrence of some condition depending on the embodiment. It should be appreciated that each of the utilization threshold, the power consumption change amounts, and the power utilization assessment condition may be static values predetermined by the group controller 102 or may be dynamically determined.

In block 312, the group controller 102 retrieves a list 216 of servers 108 for which to adjust power consumption. As discussed above, the server list 216 may identify all of the servers 108 belonging to the group associated with the group controller 102 and may be stored on the group controller 102 or retrieved from a remote device (e.g., a cloud computing device). In block 314, the group controller 102 receives resource utilization data 214 from each of the servers 108 in the list 216. In some embodiments, the resource utilization data 214 is received in response to a request from the group controller 102, whereas in other embodiments, the resource utilization data 214 is transmitted to the group controller 102 from the servers 108 in response to the occurrence of some condition (e.g., periodically) on the servers 108 as discussed above. It should also be appreciated that blocks 304, 312, and 314 may occur in another order in another embodiment.

In block 316, the group controller 102 sorts the server list 216 according to the resource utilization data 214. As indicated above, the resource utilization data 214 may include information regarding an amount, type, and/or extent of utilization of a particular resource of the servers 108 (e.g., memory utilization, processor utilization, network utilization, or other resource utilization information). In some embodiments, the group controller 102 sorts the server list 216 according to the utilization of a particular resource. For example, the group controller 102 may sort the server list 216 according to an amount of memory utilization of the servers 108 in the list 216 with the server 108 having the least memory utilization at one end of the sorted list (i.e., at the beginning or end of sorted list) and the server 108 having the greatest memory utilization at the other end of the sorted list. Of course, the sorted list also may be generated based on utilization of other resources of the servers 108, alone or in combination, in other embodiments.

In block 318, the group controller 102 identifies source and destination servers based on the sorted list. In some embodiments, one half (i.e., the top half or bottom half) of the sorted list may be identified as source servers and the other half may be identified as destination servers based on the resource utilization data 214. As discussed below, assuming the utilization threshold is met, source servers are those in which power consumption is to be reduced by the power consumption change amount and destination servers are those in which power consumption is to be increased by the corresponding power consumption change amount in some embodiments. In an embodiment in which there is an odd number of servers 108 in the sorted list, the "middle" server 108 may be handled in a suitable manner depending on the particular embodiment (e.g., ignored).

Referring now to FIG. 4, the group controller 102 selects the next source server and the next destination server from the sorted list in block 302. In block 322, the group controller 102 calculates the difference (i.e., the utilization difference) in resource utilization between the selected source and destination servers based on the resource utilization data 214 associated with the particular resource (e.g., memory) by which the list 216 was sorted. In block 324, the group controller 102 determines whether the utilization difference exceeds the utilization threshold determined in block 306 of FIG. 3. If not, the method 300 returns to block 320 in which the group controller 102 selects the next source server and the next destination server. As discussed above, the pairs of source and destination servers may be selected in any suitable manner. If the group controller 102 determines that the utilization difference does exceed the utilization threshold, the group controller 102 adjusts the power consumption between the selected source and destination servers in block 326. For example, in block 328, the group controller 102 may increase the processor utilization of the source server by the established budget change amount. Additionally, in block 330, the group controller 102 may decrease the processor utilization of the destination server by a corresponding power consumption change amount. As discussed above, the group controller 102 may modify the processor utilization by, for example, adjusting the frequency operating point of the processor.

In block 332, the group controller 102 determines whether there are any remaining source and destination servers in the sorted list for which the group controller 102 has not yet addressed (e.g., calculated a utilization difference). If so, the method 300 returns to block 320 in which the group controller 102 selects the next source and destination server pair for which to calculate the utilization difference. If no such pairs remain, however, the group controller 102 waits until a power utilization assessment condition has been satisfied in block 334. That is, the group controller 102 monitors for the occurrence of one or more of the power utilization assessment conditions determined in block 310 of FIG. 3. As discussed above, the power utilization assessment condition identifies a condition (e.g., expiration of a timer), which if satisfied, indicates that the group controller 102 should reassess the resource utilization data 214 of the servers 108. If the condition has been satisfied, the method 300 returns to block 314 of FIG. 3 in which the group controller 102 receives new resource utilization data 214 of the servers 108. It should be appreciated that, in some embodiments, the group controller 102 may receive the resource utilization data 214 in another order relative to the occurrence of the assessment condition.

Figure 5:
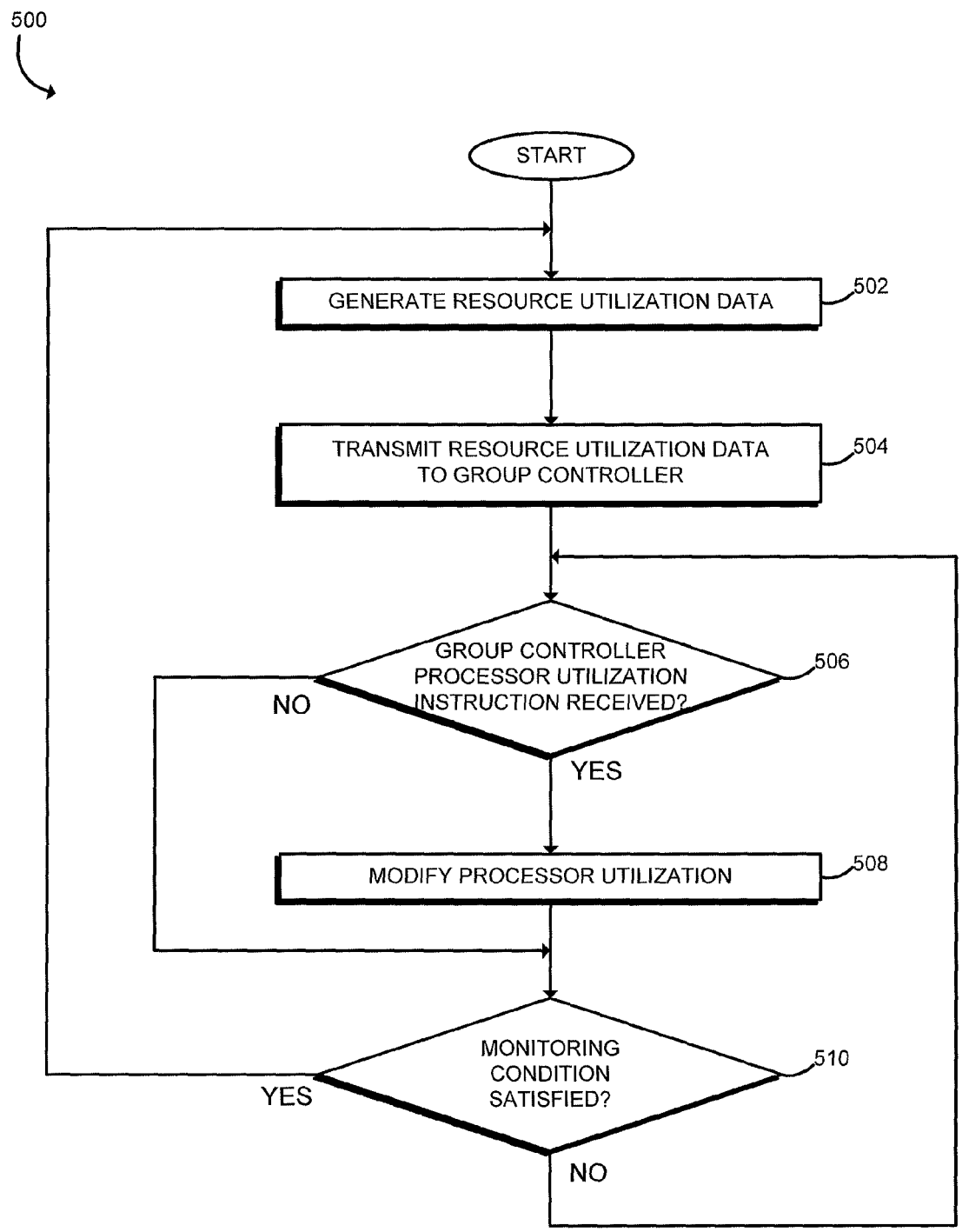
FIG. 5 is a simplified flow diagram of at least one embodiment of a method for power optimization on the server of the system of FIG. 1.

Referring now to FIG. 5, in use, one or more of the servers 108 of the system 100 may execute a method 500 for power optimization. The illustrative method 500 begins with block 502 in which the server 108 generates resource utilization data 214 based on monitored utilization of one or more resources of the server 108. In block 504, the server 108 transmits the generated resource utilization data 214 to the group controller 102. As discussed above, the resource utilization data 214 may be generated and transmitted in any suitable form or structure. In block 506, the server 108 determines whether an instruction has been received from the group controller 102 to modify the processor utilization of the server 108. Of course, in another embodiment, the server 108 may determine whether some other power balancing instruction has been received from the group controller 102. For example, another power balancing instruction may be related to modifying another resource or component of the server 108 (e.g., a network card).

If the server 108 determines that a processor utilization instruction has been received from the group controller 102, the server 108 modifies the processor utilization accordingly in block 508. As discussed above, the server 108 may do so by, for example, modifying the frequency operating point of the processor; the processor utilization is increased by decreasing the frequency operating point and decreased by increasing the frequency operating point of the processor. In another embodiment, if the server 108 receives another power balancing instruction, the server 108 may appropriately modify the utilization of the relevant components. If the server 108 determines in block 506 that a processor utilization instruction has not been received or the server has modified the processor utilization in block 508, the server 108 determines whether a monitoring condition has been satisfied in block 510. As indicated above, the server 108 may establish a monitoring condition, which defines a condition that, if satisfied, results in the server 108 generating resource utilization data 214 and transmitting the resource utilization data 214 to the group controller 102. If the server 108 determines that a monitoring condition has been satisfied, the method 500 returns to block 502 in which the server 108 generates current resource utilization data 214. Otherwise, the method 500 returns to block 506 in which the server 108 determines whether a processor utilization instruction (or, more generally, a power balancing instruction) has been received from the group controller 102.

EXAMPLES

Illustrative examples of the technologies disclosed herein are provided below. An embodiment of the technologies may include any one or more, and any combination of, the examples described below.

Example 1 includes a computing device for adjusting server power consumption, the computing device comprising a communication module to receive resource utilization data from a plurality of servers; and a power balancing module to (i) identify a source server and a destination server of the plurality of servers based on the resource utilization data, (ii) calculate a difference in resource utilization between the identified source server and the identified destination server based on the resource utilization data, (iii) increase processor utilization of a processor of the source server by a power consumption change amount in response to a determination that the difference in resource utilization exceeds a threshold value, and (iv) decrease processor utilization of a processor of the destination server by a corresponding power consumption change amount in response to a determination that the difference in resource utilization exceeds the threshold value.

Example 2 includes the subject matter of Example 1, and wherein the computing device comprises a group controller of a group of servers including the plurality of servers.

Example 3 includes the subject matter of any of Examples 1 and 2, and wherein the communication module is to retrieve a list of servers including the plurality of servers; and the power balancing module is to sort the list of servers based on an amount of resource utilization of the servers.

Example 4 includes the subject matter of any of Examples 1-3, and wherein the power balancing module is to identify one half of the servers in the sorted list as destination servers and one other half of the servers in the sorted list as source servers based on the order of the servers in the sorted list.

Example 5 includes the subject matter of any of Examples 1-4, and wherein the resource utilization data identifies an amount of memory utilization of the corresponding server.

Example 6 includes the subject matter of any of Examples 1-5, and wherein to increase the processor utilization of the processor of the source server comprises to modify a processor state of the processor of the source server, wherein the processor state defines a frequency operating point of the processor.

Example 7 includes the subject matter of any of Examples 1-6, and wherein to increase the processor utilization of the processor of the source server comprises to reduce an operating frequency of the processor of the source server; and wherein to decrease the processor utilization of the processor of the destination server comprises to increase an operating frequency of the processor of the destination server.

Example 8 includes the subject matter of any of Examples 1-7, and wherein the communication module is to periodically receive resource utilization data from the plurality of servers.

Example 9 includes a server for power optimization, the server comprising a hardware monitor module to (i) monitor utilization of a resource of the server and (ii) generate resource utilization data based on the monitored resource utilization; a communication module to (i) transmit the resource utilization data to a group controller of a group of servers including the server, and (ii) receive an instruction from the group controller to modify processor utilization of a processor of the server in response to transmission of the resource utilization data, wherein receipt of the instruction is an indication that the resource utilization data of the server differs from resource utilization data of another server of the group of servers by at least a threshold amount; and a security co-processor to modify processor utilization of the processor of the server by a power consumption change amount based on the instruction of the group controller.

Example 10 includes the subject matter of Example 9, and wherein to modify the processor utilization of the processor comprises to modify a processor state of the processor, wherein the processor state defines a frequency operating point of the processor.

Example 11 includes the subject matter of any of Examples 9 and 10, and wherein the security co-processor is to increase an operating frequency of the processor in response to receipt of an instruction from the group controller to decrease the processor utilization of the processor; and decrease the operating frequency of the processor in response to receipt of an instruction from the group controller to increase the processor utilization of the processor.

Example 12 includes the subject matter of any of Examples 9-11, and wherein the communication module is to periodically transmit the resource utilization data to the group controller.

Example 13 includes the subject matter of any of Examples 9-12, and wherein the resource utilization data identifies an amount of memory utilization of the server.

Example 14 includes a method for adjusting server power consumption with a computing device, the method comprising receiving, with the computing device, resource utilization data from a plurality of servers; identifying, on the computing device, a source server and a destination server of the plurality of servers based on the resource utilization data; calculating, on the computing device, a difference in resource utilization between the identified source server and the identified destination server based on the resource utilization data; increasing, with the computing device, processor utilization of a processor of the source server by a power consumption change amount in response to determining that the difference in resource utilization exceeds a threshold value; and decreasing, with the computing device, processor utilization of a processor of the destination server by a corresponding power consumption change amount in response to determining that the difference in resource utilization exceeds the threshold value.

Example 15 includes the subject matter of Example 14, and wherein receiving the resource utilization data comprises receiving resource utilization data from a plurality of servers belonging to a group of servers for which the computing device is a group controller.

Example 16 includes the subject matter of any of Examples 14 and 15, and further including retrieving, with the computing device, a list of servers including the plurality of servers; and sorting, on the computing device, the list of servers based on an amount of resource utilization of the servers.

Example 17 includes the subject matter of any of Examples 14-16, and further including identifying, on the computing device, one half of the servers in the sorted list as destination servers and one other half of the servers in the sorted list as source servers based on the order of the servers in the sorted list.

Example 18 includes the subject matter of any of Examples 14-17, and wherein receiving the resource utilization data comprises receiving resource utilization data from a plurality of servers, the resource utilization data identifying an amount of memory utilization of the corresponding server.

Example 19 includes the subject matter of any of Examples 14-18, and wherein increasing the processor utilization of the processor of the source server comprises modifying a processor state of the processor of the source server, the processor state defining a frequency operating point of the processor.

Example 20 includes the subject matter of any of Examples 14-19, and wherein increasing the processor utilization of the processor of the source server comprises reducing an operating frequency of the processor of the source server; and wherein decreasing the processor utilization of the processor of the destination server comprises increasing an operating frequency of the processor of the destination server.

Example 21 includes the subject matter of any of Examples 14-20, and wherein receiving the resource utilization data comprises periodically receiving resource utilization data from the plurality of servers.

Example 22 includes a computing device comprising a processor; and a memory having stored therein a plurality of instructions that when executed by the processor cause the computing device to perform the method of any of Examples 14-21.

Example 23 includes one or more machine readable storage media comprising a plurality of instructions stored thereon that in response to being executed result in a computing device performing the method of any of Examples 14-21.

Example 24 includes a computing device for managing location privacy, the computing device comprising means for performing the method of any of Examples 14-21.

Example 25 includes a method for power optimization on a server, the method comprising monitoring, on the server, utilization of a resource of the server; generating, on the server, resource utilization data based on the monitored resource utilization; transmitting, from the server, the resource utilization data to a group controller of a group of servers including the server; receiving, with the server, an instruction from the group controller to modify processor utilization of a processor of the server in response to transmitting the resource utilization data, wherein receipt of the instruction is an indication that the resource utilization data of the server differs from resource utilization data of another server of the group of servers by at least a threshold amount; and modifying, on the server, processor utilization of the processor by a power consumption change amount based on the instruction of the group controller.

Example 26 includes the subject matter of Example 25, and wherein modifying the processor utilization of the processor comprises modifying a processor state of the processor, the processor state defining a frequency operating point of the processor.

Example 27 includes the subject matter of any of Examples 25 and 26, and wherein modifying the processor utilization of the processor comprises increasing an operating frequency of the processor in response to receiving an instruction from the group controller to decrease the processor utilization of the processor; and decreasing the operating frequency of the processor in response to receiving an instruction from the group controller to increase the processor utilization of the processor.

Example 28 includes the subject matter of any of Examples 25-27, and wherein transmitting the resource utilization data comprises periodically transmitting the resource utilization data to the group controller.

Example 29 includes the subject matter of any of Examples 25-28, and wherein generating the resource utilization data comprises generating resource utilization data identifying an amount of memory utilization of the server.

Example 30 includes a computing device comprising a processor; and a memory having stored therein a plurality of instructions that when executed by the processor cause the computing device to perform the method of any of Examples 25-29.

Example 31 includes one or more machine readable storage media comprising a plurality of instructions stored thereon that in response to being executed result in a computing device performing the method of any of Examples 25-29.

Example 32 includes a computing device for managing location privacy, the computing device comprising means for performing the method of any of Examples 25-29.

The invention claimed is:

1. A computing device for adjusting server power consumption, the computing device comprising:
   a communication module to receive resource utilization data from a plurality of servers; and
   a power balancing module to (i) identify a source server and a destination server of the plurality of servers based on the resource utilization data, (ii) calculate a difference in resource utilization between the identified source server and the identified destination server based on the resource utilization data, (iii) increase processor utilization of a processor of the source server by a power consumption change amount in response to a determination that the difference in resource utilization exceeds a threshold value, and (iv) decrease processor utilization of a processor of the destination server by a corresponding power consumption change amount in response to a determination that the difference in resource utilization exceeds the threshold value.

2. The computing device of claim 1, wherein the computing device comprises a group controller of a group of servers including the plurality of servers.

3. The computing device of claim 1, wherein:
the communication module is to retrieve a list of servers including the plurality of servers; and
the power balancing module is to (i) sort the list of servers based on an amount of resource utilization of the servers and (ii) identify one half of the servers in the sorted list as destination servers and one other half of the servers in the sorted list as source servers based on the order of the servers in the sorted list.

4. The computing device of claim 1, wherein the resource utilization data identifies an amount of memory utilization of the corresponding server.

5. The computing device of claim 1, wherein to increase the processor utilization of the processor of the source server comprises to modify a processor state of the processor of the source server, wherein the processor state defines a frequency operating point of the processor.

6. The computing device of claim 1, wherein to increase the processor utilization of the processor of the source server comprises to reduce an operating frequency of the processor of the source server; and
wherein to decrease the processor utilization of the processor of the destination server comprises to increase an operating frequency of the processor of the destination server.

7. The computing device of claim 1, wherein the communication module is to periodically receive resource utilization data from the plurality of servers.

8. A server for power optimization, the server comprising:
a hardware monitor module to (i) monitor utilization of a resource of the server and (ii) generate resource utilization data based on the monitored resource utilization;
a communication module to (i) transmit the resource utilization data to a group controller of a group of servers including the server, and (ii) receive an instruction from the group controller to modify processor utilization of a processor of the server in response to transmission of the resource utilization data, wherein receipt of the instruction is an indication that the resource utilization data of the server differs from resource utilization data of another server of the group of servers by at least a threshold amount; and
a security co-processor to modify processor utilization of the processor of the server by a power consumption change amount based on the instruction of the group controller.

9. The server of claim 8, wherein to modify the processor utilization of the processor comprises to modify a processor state of the processor, wherein the processor state defines a frequency operating point of the processor.

10. The server of claim 8, wherein the security co-processor is to:
increase an operating frequency of the processor in response to receipt of an instruction from the group controller to decrease the processor utilization of the processor; and decrease the operating frequency of the processor in response to receipt of an instruction from the group controller to increase the processor utilization of the processor.

11. The server of claim 8, wherein the communication module is to periodically transmit the resource utilization data to the group controller.

12. The server of claim 8, wherein the resource utilization data identifies an amount of memory utilization of the server.

13. One or more non-transitory machine readable storage media comprising a plurality of instructions stored thereon that, in response to execution by a computing device, cause the computing device to:
receive resource utilization data from a plurality of servers;
identify a source server and a destination server of the plurality of servers based on the resource utilization data;
calculate a difference in resource utilization between the identified source server and the identified destination server based on the resource utilization data;
increase processor utilization of a processor of the source server by a power consumption change amount in response to determining that the difference in resource utilization exceeds a threshold value; and
decrease processor utilization of a processor of the destination server by a corresponding power consumption change amount in response to determining that the difference in resource utilization exceeds the threshold value.

14. The one or more non-transitory machine readable storage media of claim 13, wherein the plurality of instructions further cause the computing device to:
retrieve a list of servers including the plurality of servers;
sort the list of servers based on an amount of resource utilization of the servers; and
identify one half of the servers in the sorted list as destination servers and one other half of the servers in the sorted list as source servers based on the order of the servers in the sorted list.

15. The one or more non-transitory machine readable storage media of claim 13, wherein to receive the resource utilization data comprises to receive resource utilization data from a plurality of servers, the resource utilization data identifying an amount of memory utilization of the corresponding server.

16. The one or more non-transitory machine readable storage media of claim 13, wherein to increase the processor utilization of the processor of the source server comprises to modify a processor state of the processor of the source server, the processor state defining a frequency operating point of the processor.

17. The one or more non-transitory machine readable storage media of claim 13, wherein to increase the processor utilization of the processor of the source server comprises to reduce an operating frequency of the processor of the source server; and
wherein to decrease the processor utilization of the processor of the destination server comprises to increase an operating frequency of the processor of the destination server.

18. The one or more non-transitory machine readable storage media of claim 13, wherein to receive the resource utilization data comprises to periodically receive resource utilization data from the plurality of servers.

19. A method for adjusting server power consumption with a computing device, the method comprising:

receiving, with the computing device, resource utilization data from a plurality of servers;

identifying, on the computing device, a source server and a destination server of the plurality of servers based on the resource utilization data;

calculating, on the computing device, a difference in resource utilization between the identified source server and the identified destination server based on the resource utilization data;

increasing, with the computing device, processor utilization of a processor of the source server by a power consumption change amount in response to determining that the difference in resource utilization exceeds a threshold value; and decreasing, with the computing device, processor utilization of a processor of the destination server by a corresponding power consumption change amount in response to determining that the difference in resource utilization exceeds the threshold value.

20. The method of claim 19, further comprising:

retrieving, with the computing device, a list of servers including the plurality of servers;

sorting, on the computing device, the list of servers based on an amount of resource utilization of the servers; and identifying, on the computing device, one half of the servers in the sorted list as destination servers and one other half of the servers in the sorted list as source servers based on the order of the servers in the sorted list.

21. The method of claim 19, wherein receiving the resource utilization data comprises receiving resource utilization data from a plurality of servers, the resource utilization data identifying an amount of memory utilization of the corresponding server.

22. The method of claim 19, wherein increasing the processor utilization of the processor of the source server comprises modifying a processor state of the processor of the source server, the processor state defining a frequency operating point of the processor.

23. The method of claim 19, wherein increasing the processor utilization of the processor of the source server comprises reducing an operating frequency of the processor of the source server; and wherein decreasing the processor utilization of the processor of the destination server comprises increasing an operating frequency of the processor of the destination server.

24. The method of claim 19, wherein receiving the resource utilization data comprises periodically receiving resource utilization data from the plurality of servers.

* * * * *